(12) United States Patent
Feng et al.

(10) Patent No.: US 12,000,591 B1
(45) Date of Patent: Jun. 4, 2024

(54) ADJUSTABLE CAMPING WOOD-BURNING STOVE

(71) Applicant: SainStore Technology Co., Ltd., Dongguan (CN)

(72) Inventors: Chuansong Feng, Guang'an (CN); Shuqi Gao, Huizhou (CN); Tianle Cheng, Shanghai (CN); Hua Liao, Shenzhen (CN)

(73) Assignee: SainStore Technology Co., Ltd., Dongguan (CN)

( * ) Notice: Subject to any disclaimer, the term of this patent is extended or adjusted under 35 U.S.C. 154(b) by 0 days.

(21) Appl. No.: 18/432,030

(22) Filed: Feb. 4, 2024

(30) Foreign Application Priority Data

May 9, 2023 (CN) .......................... 202310517718.7

(51) Int. Cl.
*F24B 1/181* (2006.01)
*F24B 1/191* (2006.01)

(52) U.S. Cl.
CPC ............ *F24B 1/181* (2013.01); *F24B 1/1915* (2013.01)

(58) Field of Classification Search
CPC ................................ F24B 1/181; F24B 1/1915
See application file for complete search history.

(56) References Cited

U.S. PATENT DOCUMENTS

| 6,516,792 B1* | 2/2003 | McDonald | F24B 1/207 126/30 |
| 2017/0198916 A1* | 7/2017 | Rohbock | A47J 37/0763 |
| 2024/0053020 A1* | 2/2024 | Weilert | F24C 1/16 |

FOREIGN PATENT DOCUMENTS

| CN | 102759124 A | 10/2012 |
| CN | 104654363 A | 5/2015 |
| CN | 213686919 U | 7/2021 |

\* cited by examiner

*Primary Examiner* — Alfred Basichas
(74) *Attorney, Agent, or Firm* — Nitin Kaushik (57) ABSTRACT

The present invention discloses an adjustable camping wood-burning stove in the technical field of wood-burning stoves, including a stove body. A fixing disk is threadedly connected to the bottom surface of the stove body. A support mechanism is arranged on the fixing disk. An ash collecting disk is arranged on the bottom surface of the fixing disk. The support mechanism is rotationally connected in the ash collecting disk. Three chutes are formed in the stove body. A lifting mechanism is slidingly connected in the chute. The lifting mechanism is provided in the stove body. A stove plate is movably connected to the lifting mechanism. Two sealing plates are slidingly connected between the two fixing strips, which effectively adjusts an apparatus, makes it more convenient to use the apparatus, and further improves the practicability and convenience of the apparatus.

8 Claims, 7 Drawing Sheets

ADJUSTABLE CAMPING WOOD-BURNING STOVE

CROSS-REFERENCE TO RELATED APPLICATIONS

The application claims priority to Chinese patent application No. 2023105177187, filed on May 9, 2023, the entire contents of which are incorporated herein by reference.

TECHNICAL FIELD

The present invention relates to the technical field of a wood-burning stove, and specifically to an adjustable camping wood-burning stove.

BACKGROUND

With the improvement of residents' income and living standards, people organize a variety of outdoor activities such as parent-child tours, self-help tours, self-driving tours on Sundays and holidays. To make outdoor activities colorful, it needs to carry an outdoor stove in outdoor activities. There are a wide variety of outdoor stoves currently. According to use functions, the outdoor stove can be divided into a gas stove, an oil stove and a wood-burning stove. The gas stove and the oil stove are inconvenient to ordinary consumers because the gas stove and the oil stove need to be equipped with a gas canister or oil. Second, it is more difficult for the gas stove and the oil stove to replenish energy on site. The gas stove and the oil stove have security problems during carrying and use processes. Therefore, there is a certain limitation in the use of the gas stove and the oil stove.

The wood-burning stove is favored by ordinary consumers because of abundant firewood resources, safe and convenient portability, and low cost of use. However, the wood-burning stove in the prior art has the following problems in a use process: first, the wood-burning stove in the prior art is generally used in a one-piece structure, and the volume of a hearth requires to be relatively large, resulting in a large overall product size, a big weight, and inconvenience to carry outside. Second, the wood-burning stove in the prior art has only a single function. If a user also wants to barbecue, the wood-burning stove needs to be equipped with another barbecue grill, thereby bringing more difficulties to travel. In view of the above problems, many manufacturers and people of vision invest in a large amount of manpower and material resources in development and research, but so far there is not yet a more desirable product.

In the patent number CN201620574149.5, a technical solution is disclosed, fully solves the above problems, but has several problems in use. When the technical solution is used, after all parts are assembled, because the bottom of an apparatus is in a horizontal state, a user has no way to fully adjust the apparatus when the user needs to adjust the height of the apparatus. Moreover, because the bottom of the apparatus is horizontal, when the ground is uneven, the balance of the apparatus can not be adjusted, which leads to the apparatus in an uneven state, thus affecting the use of the apparatus. During burning, a distance between a burning material and a boiler can not be adjusted in the technical solution. Therefore, the boiler is too far from or too close to the burning material, which results in incomplete absorption of heat when the burning material is too far from the boiler, and leads to over-absorption of the heat when the burning material is too close to the boiler. Therefore, the heating of an object in the boiler is affected. In the patent number CN202021244456.X, a technical solution is also disclosed. An apparatus can be adjusted in the technical solution, but the bottom of the apparatus is still in a horizontal state, resulting in a problem being the same as the above problems in adjustment. Because adjustment can be performed only when an outer shell is sleeved on the outer side of the apparatus, the overall apparatus is heavier, which affects the apparatus to carry.

Based on this, the present invention is designed as an adjustable camping wood-burning stove to solve the above problems.

SUMMARY

An objective of the present invention is to provide an adjustable camping wood-burning stove to solve the problem that an apparatus proposed in the above background has an inability to be adequately adjusted to guarantee the safe use of the apparatus.

To achieve the foregoing objective, the present invention provides the following technical solutions.

An adjustable camping firewood stove includes a stove body. A fixing disk is threadedly connected to the bottom surface of the stove body. A support mechanism is arranged on the fixing disk. An ash collecting disk is arranged on the bottom surface of the fixing disk. The support mechanism is rotationally connected in the ash collecting disk. Three chutes are formed in the stove body. A lifting mechanism is slidingly connected in the chute. The lifting mechanism is provided in the stove body. A stove plate is movably connected to the lifting mechanism. A driving mechanism is movably connected between the support mechanism and the lifting mechanism. Two fixing strips are mounted on the stove body. Two sealing plates are slidingly connected between the two fixing strips.

As a further solution of the present invention, the support mechanism includes a threaded sleeve, a sliding ring, a first support seat, a support rod, a pulling rod, and a base mechanism. The threaded sleeve is rotationally connected on the fixing disk. The sliding ring is threadedly connected on the threaded sleeve. The three first support seats are mounted on the bottom surface of the fixing disk. The support rod is rotationally connected in the first support seat. The pulling rod is provided between the support rod and the sliding ring. The base mechanism is provided at one end of the support rod. A slot is formed on the threaded sleeve.

As a further solution of the present invention, the base mechanism includes a second support seat, a fixing plate, a first spring, a base plate, an adjusting plate, and a bolt. The second support seat is rotationally connected to one end of the support rod. The fixing plate is mounted at one end of the second support seat. The four first springs are fixedly connected on the bottom surface of the fixing plate. The four first springs are located at the four corners of the bottom surface of the fixing plate. The base plate is mounted among the four first springs. The adjusting plate is provided on both of the base plate and the fixing plate. The two adjusting plates are provided in a stagger mode. The bolt is threadedly provided between the two adjusting plates.

As a further solution of the present invention, the lifting mechanism includes a fixing frame, a threaded rod, a moving sleeve, a placing frame, and a slider. The fixing frame is fixedly connected in the stove body. The threaded rod is rotationally connected on the fixing frame. The moving sleeve is threadedly connected on the threaded rod. The placing frame is mounted at one end of the moving sleeve.

The three sliders are provided on the placing frame. The slider is slidingly connected in the chute. Another slot is formed on the threaded rod.

As a further solution of the present invention, an ash discharge hopper is provided in the stove body. The ash discharge hopper is in a shape of a round table. The lifting mechanism is located on the inner side of the ash discharge hopper.

As a further solution of the present invention, the driving mechanism includes a rotating rod, a second spring, a block, and a rotating handle. The rotating rod is movably connected in the threaded sleeve. The rotating rod is fixedly connected to two pairs of second springs. The block is mounted between the two second springs. The block is movably connected in the slot.

As a further solution of the present invention, the block is convex in shape. The rotating handle is mounted at one end of the rotating rod. A rubber anti-slip layer is provided on the surface of the rotating handle.

As a further solution of the present invention, the two sealing plates are mounted opposite to each other. A bump is provided at one end of the sealing plate. A plurality of cushioning plates are provided on the stove body. The cushioning plate is in a trapezoidal shape.

Compared with the prior art, the present invention has the following beneficial effects.

1. In the present invention, by the mutual cooperation of the driving mechanism and the support mechanism, the height of an apparatus can be fully adjusted in use so that the height of the apparatus can be changed according to the needs of a user, thereby improving the practicality and the convenience of the apparatus. In the initial state of the apparatus, the stove body and the bottom of the support mechanism are in a separate state, so that it is more convenient to carry the stove body. Further, the weight of the stove body is reduced, so that it is more labor-saving for the user to carry. When the apparatus is used in an uneven place in a field, the height of the support mechanism can be adjusted by the base mechanism. Therefore, when the apparatus is used in an uneven place in the field, stability and smoothness can be fully guaranteed, thereby avoiding the apparatus to be inclined in use, and further improving the practicality and use effect of the apparatus.

2. When the driving mechanism and the lifting mechanism cooperate with each other, the apparatus can change a burning temperature according to the user's needs when the apparatus burns, thus avoiding the distance between the burning material and the boiler on the upper side of the apparatus to be too far after height adjustment. Therefore, the temperature of the boiler can not reach the user's needs, which affects the burning of the apparatus. By adjusting the distance between the stove plate and the boiler, the waste of the burning material can be avoided. It can fully guarantee that the heat produced by the burning material is absorbed by the boiler, which then further improves the burning quality and efficiency of the apparatus. The support mechanism and the lifting mechanism in the apparatus cooperate with each other, so that it is more convenient to carry the apparatus in use, which further improves the practicality and convenience of the apparatus.

BRIEF DESCRIPTION OF DRAWINGS

In order to describe the technical solutions of embodiments in the present invention more clearly, the following briefly introduces the drawings that need to be used in the embodiments. Obviously, the drawings in the following description are only some of embodiments of the present invention. The person skilled in the art can obtain other drawings based on these drawings without creative labor.

In the drawings, the list of parts represented by each reference sigh is as follows:

1. Stove body; 2. Fixing disk; 3. Support mechanism; 4. Threaded sleeve; 5. Sliding ring; 6. First support seat; 7. Support rod; 8. Pulling rod; 9. Base mechanism; 10. Second support seat; 11. Fixing plate; 12. First spring; 13. Base plate; 14. Adjusting plate; 15. Bolt; 16. Ash collecting disk; 17. Slot; 18. Chute; 19. Lifting mechanism; 20. Fixing frame; 21. Threaded rod; 22. Moving sleeve; 23. Placing frame; 24. Slider; 25. Stove plate; 26. Ash discharge hopper; 27. Driving mechanism; 28. Rotating rod; 29. Second spring 30. Block; 31. Rotating handle; 32. Fixing strip; 33. Sealing plate; 34. Cushioning plate.

DETAILED DESCRIPTION OF THE EMBODIMENTS

The following clearly and completely describes the technical solutions in embodiments of the present invention in conjunction with the drawings in the embodiments of the present invention. Obviously, the described embodiments are only a part of the embodiments of the present invention, rather than all embodiments. Based on the embodiments of the present invention, all other embodiments obtained by the person skilled in the art without creative labor shall fall within the protection scope of the present invention.

Figure 1:
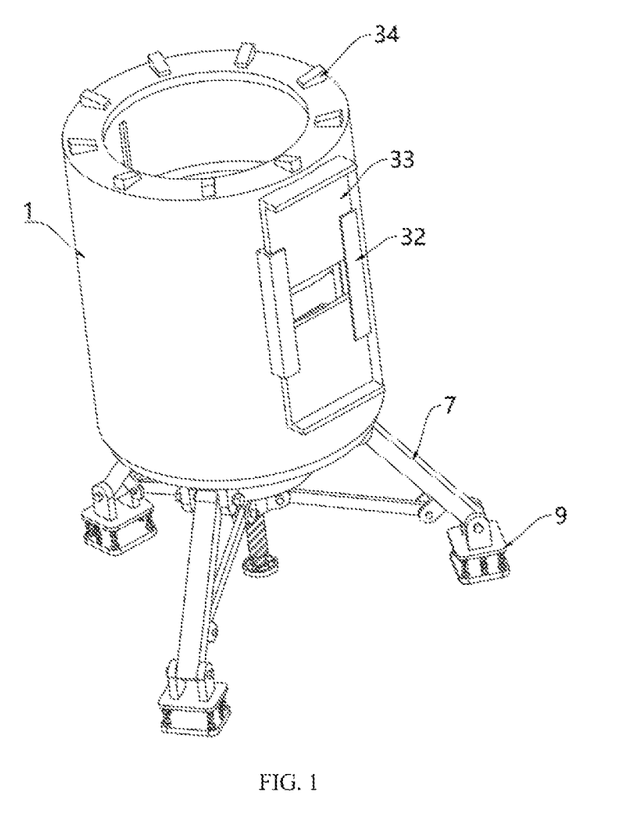
FIG. 1 is a schematic structural diagram of a front side view of the present invention.
Figure 2:
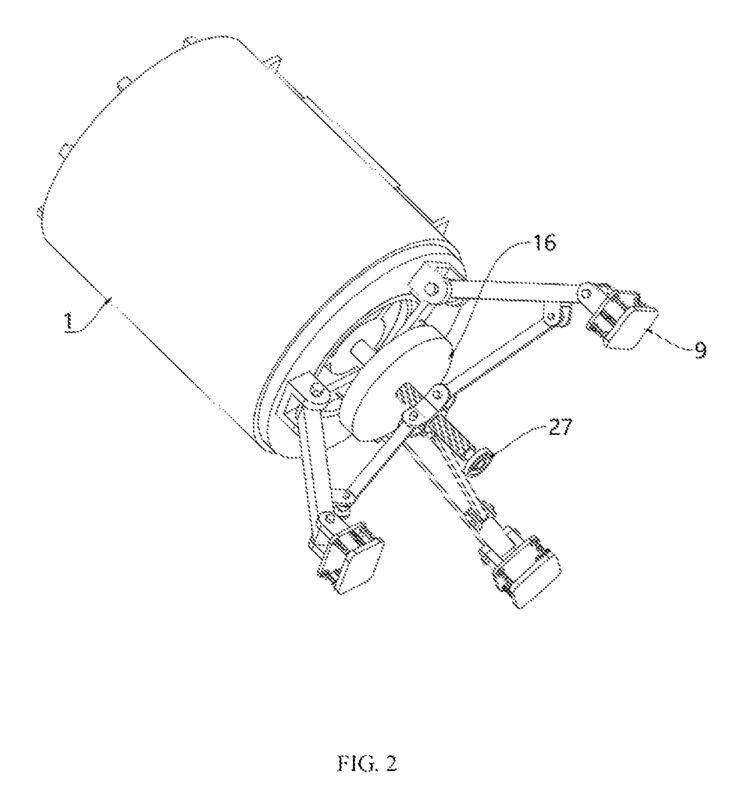
FIG. 2 is a schematic structural diagram of a lower side view of the present invention.
Figure 3:
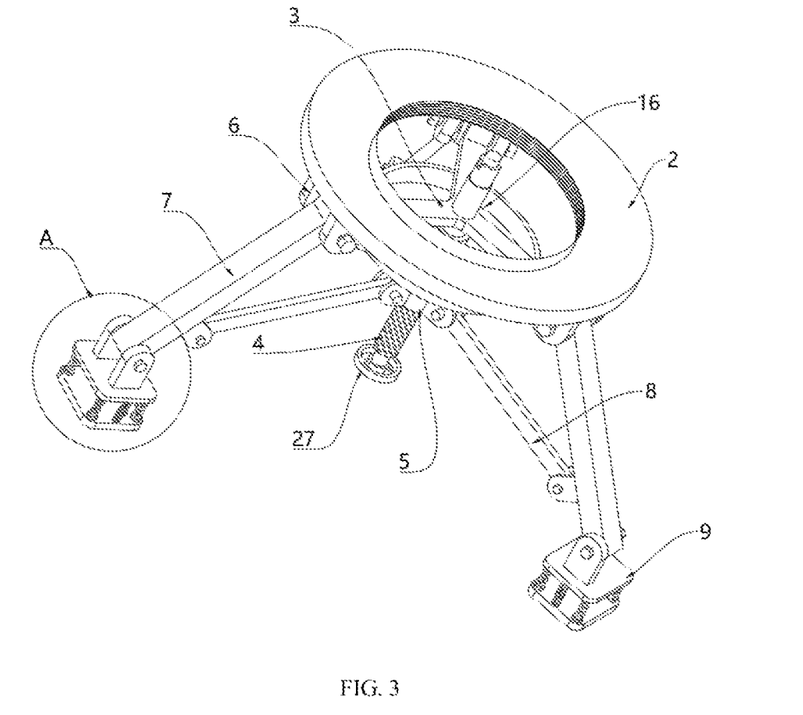
FIG. 3 is a schematic structural diagram of a partial upper side view of the present invention.
Figure 4:
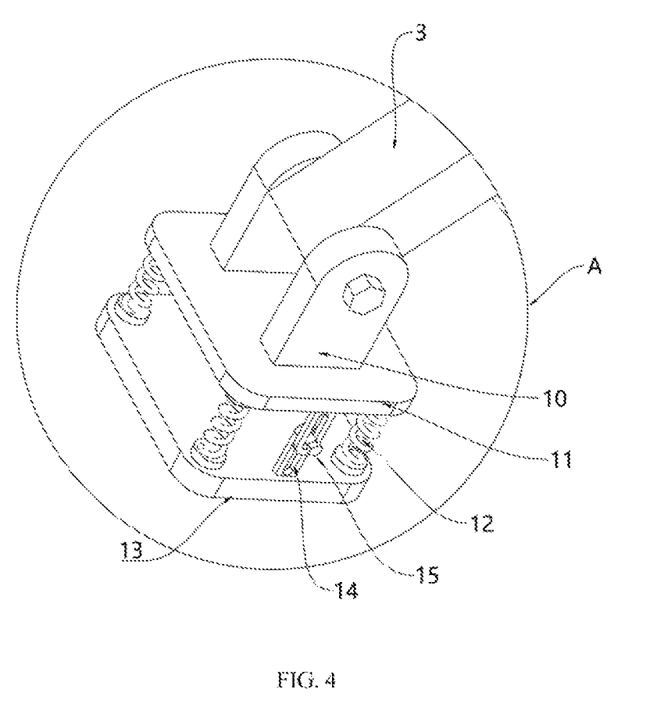
FIG. 4 is an enlarged diagram at A in FIG. 3.
Figure 5:
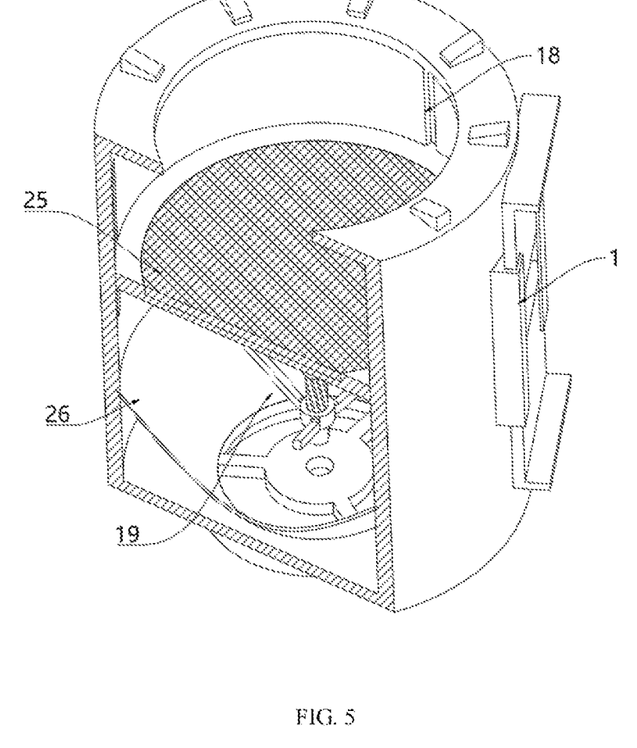
FIG. 5 is a schematic structural diagram of a partial right side view of the present invention.
Figure 6:
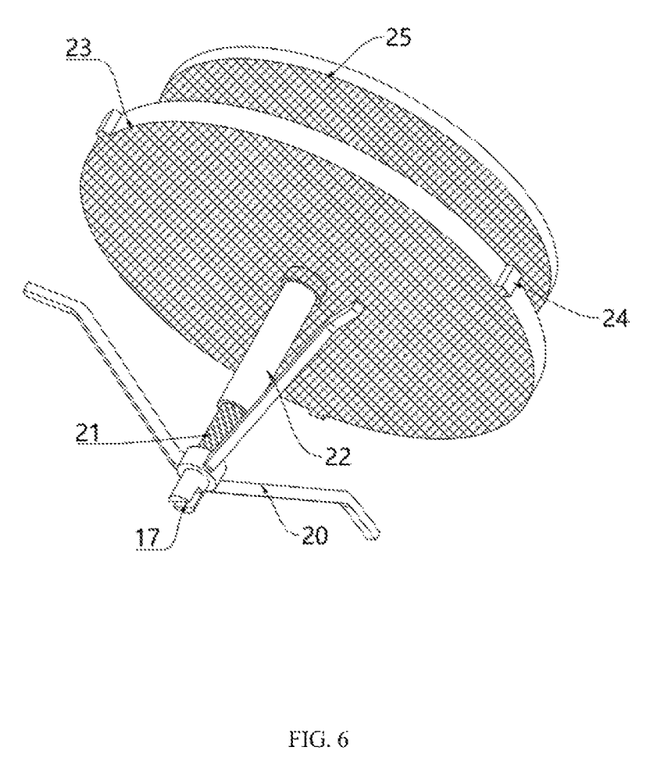
FIG. 6 is an inner schematic structural diagram of a partial lower side view of the present invention.
Figure 7:
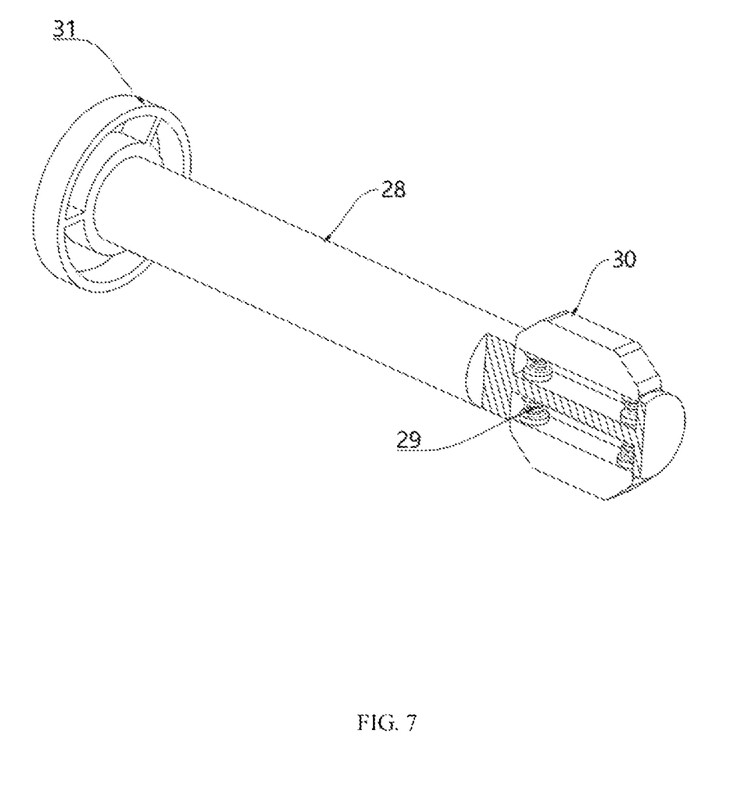
FIG. 7 is a sectional schematic structural diagram of a partial front side view of the present invention.

Referring to FIGS. 1-7, the present invention provides a technical solution.

An adjustable camping firewood stove includes a stove body 1. A fixing disk 2 is threadedly connected to the bottom surface of the stove body 1. A support mechanism 3 is arranged on the fixing disk 2. An ash collecting disk 16 is arranged on the bottom surface of the fixing disk 2. The support mechanism 3 is rotationally connected in the ash collecting disk 16. Three chutes 18 are formed in the stove body 1. A lifting mechanism 19 is slidingly connected in the chute 18. The lifting mechanism 19 is provided in the stove body 1. A stove plate 25 is movably connected to the lifting mechanism 19. A driving mechanism 27 is movably connected between the support mechanism 3 and the lifting mechanism 19. Two fixing strips 32 are mounted on the stove body 1. Two sealing plates 33 are slidingly connected between the two fixing strips 32.

When in use, the fixing disk 2 is threadedly connected to the stove body 1. In addition, the support mechanism 3 is in contact with the ground. The stove body 1 is in a vertical state, is clamped with the support mechanism 3 through the driving mechanism 27 according to a user's needs, and adjusts the support mechanism 3 through the driving mechanism 27 so that the support mechanism 3 can lift up the stove body 1. Therefore, the stove body 1 can be adapted to different heights. After the height of the support mechanism 3 is adjusted, parts in the base mechanism 9 are adjusted so that the base mechanism 9 maintains the balance of the support mechanism 3. When the stove body 1 works, and when a burning material in the stove body 1 is less, or when a burning temperature needs to be adjusted according to needs, the driving mechanism 27 is controlled so that the driving mechanism 27 and the support mechanism 3 are disengaged and the driving mechanism 27 and the lifting mechanism 19 are clamped and combined. Therefore, the lifting mechanism 19 is raised or lowered, thereby changing the temperature of an apparatus in use. When the apparatus burns, the burning material is added to a gap between the two sealing plates 33 so that the stove body 1 can be kept in a burning state at all times.

In the present invention, by the mutual cooperation of the driving mechanism 27 and the support mechanism 3, the height of an apparatus can be fully adjusted in use so that the height of the apparatus can be changed according to the needs of a user, thereby improving the practicality and the convenience of the apparatus. In the initial state of the apparatus, the stove body 1 and the bottom of the support mechanism 3 are in a separate state, so that it is more convenient to carry the stove body 1. Further, the weight of the stove body 1 is reduced, so that it is more labor-saving for the user to carry. When the apparatus is used in an uneven place in a field, the height of the support mechanism 3 can be adjusted by the base mechanism 9. Therefore, when the apparatus is used in an uneven place in a field, stability and smoothness can be fully guaranteed, thereby avoiding the apparatus to be inclined in use, and further improving the practicality and use effect of the apparatus.

When the driving mechanism 27 and the lifting mechanism 19 cooperate with each other, the apparatus can change a burning temperature according to people's needs when the apparatus burns, thus avoiding the distance between the burning material and the boiler on the upper side of the apparatus to be too far after height adjustment. Therefore, the temperature of the boiler can not reach the people's needs, which affects the burning of the apparatus. By adjusting the distance between the stove plate 25 and the boiler, the waste of a burning material can be avoided. It can fully guarantee that the heat produced by the burning material is absorbed by the boiler, which then further improves the burning quality and efficiency of the apparatus. The support mechanism 3 and the lifting mechanism 19 in the apparatus cooperate with each other, so that it is more convenient to carry the apparatus in use, which further improves the practicality and convenience of the apparatus.

As a further solution of the present invention, the support mechanism 3 includes a threaded sleeve 4, a sliding ring 5, a first support seat 6, a support rod 7, a pulling rod 8, and a base mechanism 9. The threaded sleeve 4 is rotationally connected on the fixing disk 2. The sliding ring 5 is threadedly connected on the threaded sleeve 4. The three first support seats 6 are mounted on the bottom surface of the fixing disk 2. The support rod 7 is rotationally connected in the first support seat 6. The pulling rod 8 is provided between the support rod 7 and the sliding ring 5. The base mechanism 9 is provided at one end of the support rod 7. A slot 17 is formed on the threaded sleeve 4.

When in use, the driving mechanism 27 is clamped with the threaded sleeve 4. In addition, the threaded sleeve 4 is rotated. At this time, the sliding ring 5 threaded on the threaded sleeve 4 moves upward or downward. When the threaded sleeve 4 moves upward, the threaded sleeve 4 pulls the pulling rod 8 so that the pulling rod moves upward. At this time, the pulling rod 8 pulls the support rod 7 so that the three support rods 7 move closer together. Therefore, the support rod 7 lifts up the stove body 1, thus changing the height of the stove body 1. When the threaded sleeve 4 moves downward, the threaded sleeve 4 squeezes the pulling rod 8 so that the pulling rod 8 pushes the support rod 7 to rotate outwardly. Therefore, angles among the three support rods 7 become larger. The height of the stove body 1 is then reduced.

In the present invention, parts in the support mechanism 3 cooperate with each other so that the height of the stove body 1 can be sufficiently changed by the apparatus when the apparatus is in use. Therefore, the apparatus can be adjusted more conveniently, thereby avoiding the height of the stove body 1 from being fixed, which affects the burning efficiency of the apparatus.

As a further solution of the present invention, the base mechanism 9 includes a second support seat 10, a fixing plate 11, a first spring 12, a base plate 13, an adjusting plate 14, and a bolt 15. The second support seat 10 is rotationally connected to one end of the support rod 7. The fixing plate 11 is mounted at one end of the second support seat 10. The four first springs 12 are fixedly connected on the bottom surface of the fixing plate 11. The four first springs 12 are located at the four corners of the bottom surface of the fixing plate 11. The base plate 13 is mounted among the four first springs 12. The adjusting plate 14 is provided on both of the base plate 13 and the fixing plate 11. The two adjusting plates 14 are provided in a stagger mode. The bolt 15 is threadedly provided between the two adjusting plates 14.

When in use, and when the ground is level, the base plate 13 and the first spring 12 cooperate with each other, so that the support mechanism 3 is buffered and supported by the base plate 13 and the spring, thereby guaranteeing the stability of the use of the apparatus. When a road surface is uneven, the two adjusting plates 14 move opposite to each other, so that the first spring 12 becomes longer or shorter. When the first spring 12 reaches an appropriate length, the stove body 1 is maintained in a horizontal state by the support mechanism 3 through the cooperation of the first spring 12 and the bottom plate 13. The two adjusting plates 14 are fixed by the bolt 15, so as to maintain the length of the first spring 12. Therefore, the apparatus can be placed sufficiently in an uneven position, thereby further improving the use stability and the safety of the apparatus.

As a further solution of the present invention, the lifting mechanism 19 includes a fixing frame 20, a threaded rod 21, a moving sleeve 22, a placing frame 23, and a slider 24. The fixing frame 20 is fixedly connected in the stove body 1. The threaded rod 21 is rotationally connected on the fixing frame 20. The moving sleeve 22 is threadedly connected on the threaded rod 21. The placing frame 23 is mounted at one end of the moving sleeve 22. The three sliders 24 are provided on the placing frame 23. The slider 24 is slidingly connected in the chute 18. Another slot 17 is formed on the threaded rod 21.

When in use and when the driving structure is clamped with the lifting mechanism 19, the threaded rod 21 is rotated so that the moving sleeve 22 threadedly connected on the threaded rod 21 is in an upward state. When the moving sleeve 22 is upwardly moved, the moving sleeve 22 pushes the placing frame 23 to upwardly move. The slider 24 provided on the placing frame 23 slides in the chute 18. Therefore, the height of the placing frame 23 is changed to change the height of the stove plate 25. Therefore, a distance between a burning material on the stove plate 25 and the boiler is changed, so that the apparatus can fully absorb the heat generated by burning, thereby avoiding the waste of the heat. Damage to an object in the boiler due to the excessive heat is avoided, thereby further improving the practicability and convenience of the apparatus. Therefore, the apparatus is more versatile and selective in use.

As a further solution of the present invention, an ash discharge hopper 26 is provided in the stove body 1. The ash discharge hopper 26 is in a shape of a round table. The lifting mechanism 19 is located on the inner side of the ash discharge hopper 26.

When in use and when the burning material on the stove plate 25 is burned, the waste produced by the burning material enters into the ash discharge hopper 26 through the stove plate 25, and then enters into the ash collecting disk 16 from the ash discharge hopper 26, so as to effectively collect a residue, thereby avoiding the pollution of an environment by the burning material. When the ash collecting disk 16 collects the burning material, the scalding of a user can be avoided during adjustment, thereby further improving the safety and the practicability of the apparatus.

As a further solution of the present invention, the driving mechanism 27 includes a rotating rod 28, a second spring 29, a block 30, and a rotating handle 31. The rotating rod 28 is movably connected in the threaded sleeve 4. The rotating rod 28 is fixedly connected to two pairs of second springs 29. The block 30 is mounted between the two second springs 29. The block 30 is movably connected in the slot 17.

When in use, the rotating rod 28 is inserted into the threaded sleeve 4 in the support mechanism 3 and passes through the threaded sleeve 4. When the rotating rod 28 is inserted into the threaded sleeve 4, the block 30 is squeezed because the block 30 is in a convex shape. At this time, the block 30 squeezes the second spring 29 and enters into the inner side of the rotating rod 28. When one end of the rotating rod 28 passes through the threaded sleeve 4, the elastic force of the second spring 29 acts on the block 30, so that the two blocks 30 are ejected. At this time, the rotating rod 28 is pushed, so that the rotating rod 28 is clamped with the slot 17 on the threaded rod 21 in the lifting mechanism 19. The rotating rod 28 is rotated so that the threaded rod 21 can be rotated, thereby regulating the height of the lifting mechanism 19. When the rotating rod 28 is pulled down, the rotating rod 28 and the threaded rod 21 are disengaged. At this time, the block 30 is clamped with the slot 17 on the threaded sleeve 4. The threaded sleeve 4 can be rotated to adjust the support mechanism 3. When not in use, the driving mechanism 27 can be received separately.

In the present invention, the driving mechanism 27 cooperates with the support mechanism 3 and the lifting mechanism 19, so that the height and the burning distance of the apparatus can be quickly adjusted when in use. Therefore, the apparatus can be used more conveniently and quickly, thereby further guaranteeing the use effect of the apparatus.

As a further solution of the present invention, the block 30 is convex in shape. The rotating handle 31 is mounted at one end of the rotating rod 28. A rubber anti-slip layer is provided on the surface of the rotating handle 31.

When in use, the block 30 is convex in shape, so that it is more convenient for the block 30 to be withdrawn and put in, which can effectively guarantee the use effect. The rotating handle 31 can effectively drive the rotating rod 28 to rotate, so that it is more convenient to adjust the apparatus.

As a further solution of the present invention, the two sealing plates 33 are mounted opposite to each other. A bump is provided at one end of the sealing plate 33. A plurality of cushioning plates 34 are provided on the stove body 1. The cushioning plate 34 is in a trapezoidal shape.

When in use and when it is necessary to add the burning material to the stove body 1, it is only necessary to pull one of the sealing plates 33, so that a gap is formed between the two sealing plates 33, and the placement of the material can be accomplished. Therefore, it is more convenient and quicker to use the apparatus.

What is claimed is:

1. An adjustable camping firewood stove, comprising a stove body (1), wherein a fixing disk (2) is threadedly connected to a bottom surface of the stove body (1), a support mechanism (3) is arranged on the fixing disk (2), an ash collecting disk (16) is arranged on a bottom surface of the fixing disk (2), the support mechanism (3) is rotationally connected in the ash collecting disk (16), three chutes (18) are formed in the stove body (1), a lifting mechanism (19) is slidingly connected in the chute (18), the lifting mechanism (19) is provided in the stove body (1), a stove plate (25) is movably connected to the lifting mechanism (19), a driving mechanism (27) is movably connected between the support mechanism (3) and the lifting mechanism (19), two fixing strips (32) are mounted on the stove body (1), and two sealing plates (33) are slidingly connected between the two fixing strips (32).

2. The adjustable camping wood-burning stove according to claim 1, wherein the support mechanism (3) comprises a threaded sleeve (4), a sliding ring (5), a first support seat (6), a support rod (7), a pulling rod (8), and a base mechanism (9), the threaded sleeve (4) is rotationally connected on the fixing disk (2), the sliding ring (5) is threadedly connected on the threaded sleeve (4), the three first support seats (6) are mounted on a bottom surface of the fixing disk (2), the support rod (7) is rotationally connected in the first support seat (6), the pulling rod (8) is provided between the support rod (7) and the sliding ring (5), the base mechanism (9) is provided at one end of the support rod (7), and a slot (17) is formed on the threaded sleeve (4).

3. The adjustable camping wood-burning stove according to claim 2, wherein the base mechanism (9) comprises a second support seat (10), a fixing plate (11), a first spring (12), a base plate (13), an adjusting plate (14), and a bolt (15), the second support seat (10) is rotationally connected to one end of the support rod (7), the fixing plate (11) is mounted at one end of the second support seat (10), the four first springs (12) are fixedly connected on a bottom surface of the fixing plate (11), the four first springs (12) are located at four corners of the bottom surface of the fixing plate (11), the base plate (13) is mounted among the four first springs (12), the adjusting plate (14) is provided on both of the base plate (13) and the fixing plate (11), the two adjusting plates (14) are provided in a stagger mode, and the bolt (15) is threadedly provided between the two adjusting plates (14).

4. The adjustable camping wood-burning stove according to claim 1, wherein the lifting mechanism (19) comprises a fixing frame (20), a threaded rod (21), a moving sleeve (22), a placing frame (23), and a slider (24), the fixing frame (20) is fixedly connected in the stove body (1), the threaded rod (21) is rotationally connected on the fixing frame (20), the moving sleeve (22) is threadedly connected on the threaded rod (21), the placing frame (23) is mounted at one end of the moving sleeve (22), the three sliders (24) are provided on the placing frame (23), the slider (24) is slidingly connected in the chute (18), and another slot (17) is formed on the threaded rod (21).

5. The adjustable camping wood-burning stove according to claim 1, wherein an ash discharge hopper (26) is provided in the stove body (1), the ash discharge hopper (26) is in a shape of a round table, and the lifting mechanism (19) is located on an inner side of the ash discharge hopper (26).

6. The adjustable camping wood-burning stove according to claim 1, wherein the driving mechanism (27) comprises a rotating rod (28), a second spring (29), a block (30), and a rotating handle (31), the rotating rod (28) is movably connected in the threaded sleeve (4), the rotating rod (28) is fixedly connected to two pairs of second springs (29), the block (30) is mounted between the two second springs (29), and the block (30) is movably connected in the slot (17).

7. The adjustable camping wood-burning stove according to claim 6, wherein the block (30) is convex in shape, the rotating handle (31) is mounted at one end of the rotating rod (28), and a rubber anti-slip layer is provided on a surface of the rotating handle (31).

8. The adjustable camping wood-burning stove according to claim 1, wherein the two sealing plates (33) are mounted opposite to each other, a bump is provided at one end of the sealing plate (33), a plurality of cushioning plates (34) are provided on the stove body (1), and the cushioning plate (34) is in a trapezoidal shape.

\* \* \* \* \*